May 17, 1960

M. N. MUSGRAVE 2,936,917

HALLOCK DUMPING MECHANISM

Filed July 21, 1958

INVENTOR.
MERRILL N. MUSGRAVE
BY
Reynolds, Beach & Christensen
ATTORNEYS

May 17, 1960  M. N. MUSGRAVE  2,936,917
HALLOCK DUMPING MECHANISM
Filed July 21, 1958  3 Sheets-Sheet 2
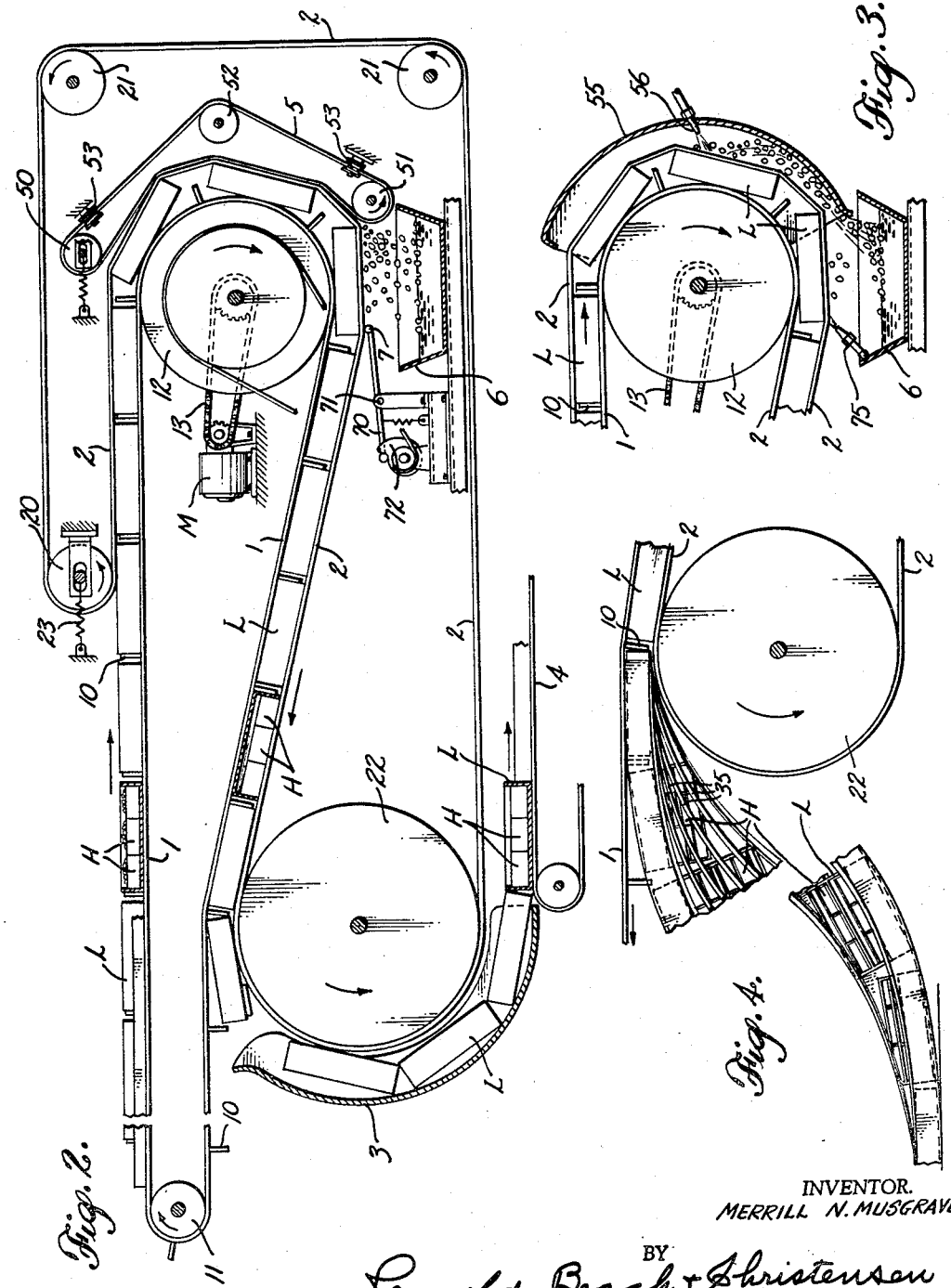
INVENTOR.
MERRILL N. MUSGRAVE
BY
Reynolds, Beach + Christensen
ATTORNEYS May 17, 1960  M. N. MUSGRAVE  2,936,917
HALLOCK DUMPING MECHANISM
Filed July 21, 1958  3 Sheets-Sheet 3

INVENTOR.
MERRILL N. MUSGRAVE
BY
Reynolds, Beach + Christensen
ATTORNEYS

United States Patent Office 2,936,917
Patented May 17, 1960

2,936,917
HALLOCK DUMPING MECHANISM
Merrill N. Musgrave, Seattle, Wash.

Application July 21, 1958, Serial No. 749,852

6 Claims. (Cl. 214—311)

Strawberries and other small fruits are picked in the field into a number, usually twelve, of hallocks or small boxes or cups of wood veneer or plastic material received loosely within a lug box. Especially when the fruit is to be processed immediately, it must be dumped from the lug boxes and from the hallocks, and processed as by washing it, sorting it, and eventually conveying it to preservative processing operations.

The present invention is concerned with the operation of dumping the fruit from the lug boxes, yet without spilling or removing the hallocks from their places within such lug boxes, and the return of the lug boxes with their hallocks completely emptied but still in place, and the lug boxes and hallocks right side up, ready for refilling in the field.

There are mechanisms which serve to dump fruit received loosely within lug boxes, but without the individual hallocks, and these dumping mechanisms do not usually reinvert the lug box but convey the lug boxes away to a stacking point, where they are usually cleaned and in the process are reinverted. An example of such a mechanism is the patent to Stilwell, et al., No. 2,540,766, dated February 6, 1951. Such mechanisms, however, are inadequate to the solution of the problem of dumping fruit when it is contained within the individual hallocks, for the reason that if the lug boxes were merely inverted and dumped the hallocks would then fall from the lug boxes and would have to be replaced; hence, the solution of this problem is only complete when it includes a reinversion device operable to reinvert the lug boxes and the hallocks without displacement of the lug boxes from their places within the hallocks, following the dumping of the fruit. The present invention is a mechanism intended to operate in that fashion and having that capability.

According to the present invention the lug boxes are advanced in succession, while upright and with the hallocks full of fruit, along a path which includes a portion wherein the lug boxes are inverted. In this inverting portion of the path the individual hallocks are engaged intermediate their sides and so are held in place and, in addition, the lug boxes are held to the conveyor, by individual cables which overlie the hallocks and lug boxes but which present no particular obstacle to the spilling out of the fruit when the lug boxes and hallocks reach a fruit-receiving station. In this manner the lug boxes are carried past the fruit-receiving station and beyond to a reinverting station. While inverted the lug boxes and hallocks rest upon the cables. At the reinverting station the lug boxes are automatically reinverted in one manner or another, and in so doing the hallocks are left in their place within the lug boxes, so that nothing is displaced but the fruit, and all is ready for refilling in the field.

Between the initial part of the inverting portion of the path of the lug boxes and the fruit-receiving station, means are provided for confining or otherwise catching and guiding the fruit to prevent its spilling or to control it so that any which spills from the lug boxes and hallocks will be caught and guided to fruit-receiving means at the latter station. In one form the mechanism so this end includes an endless blanket or belt which lies closely over each lug box as it passes through the inverting portion of its path and so holds all fruits in the hallocks, and only releases them when the lug box reaches the fruit-receiving station. Such a blanket overlies the cables that support the hallocks and lug boxes, and these latter continue on to and perhaps through the reinverting station, whereas the blanket returns to the initial part of the inverting portion of the path. In another form, the fruit-catching and guiding means may consist of no more than a shield paralleling the path of the lug boxes, through the inverting portion of their path, and lying closely enough thereto that the fruit which may spill is caught and guided clear of the lug boxes, to be deposited at the fruit-receiving station and received by the fruit-receiving means. In still another form the fruit may be received within buckets that travel with the hallocks and lug boxes, whereby the small individual fruits may not collect and pile up at any given point, and perhaps be crushed or bruised.

The lug box reinverting means are shown herein in two alternative forms, as will be described in detail hereinafter. It is desirable to provide means for insuring the dislodgement of any fruit that may tend to stick in the hallocks as the latter pass the fruit-receiving means, and means to that end is provided. It is also desirable, particularly when a fixed shield is used about the inverting portion of the path, to provide means, for instance, water jets, that insure passage of the fruit unobstructedly down the shield to the fruit-receiving means.

The general nature of the invention having been described above, it will be more thoroughly understood from the following detailed description taken in conjunction with the accompanying drawings, wherein the invention is shown more or less diagrammatically in a presently preferred form.

Figure 2 is a side elevational view of the same machine.

Figure 3 is a side elevational view of the inverting portion of the path, showing a modified form of the inverting means.

Figure 4 is a detail view of a modified form of reinverting means.

Figure 1:
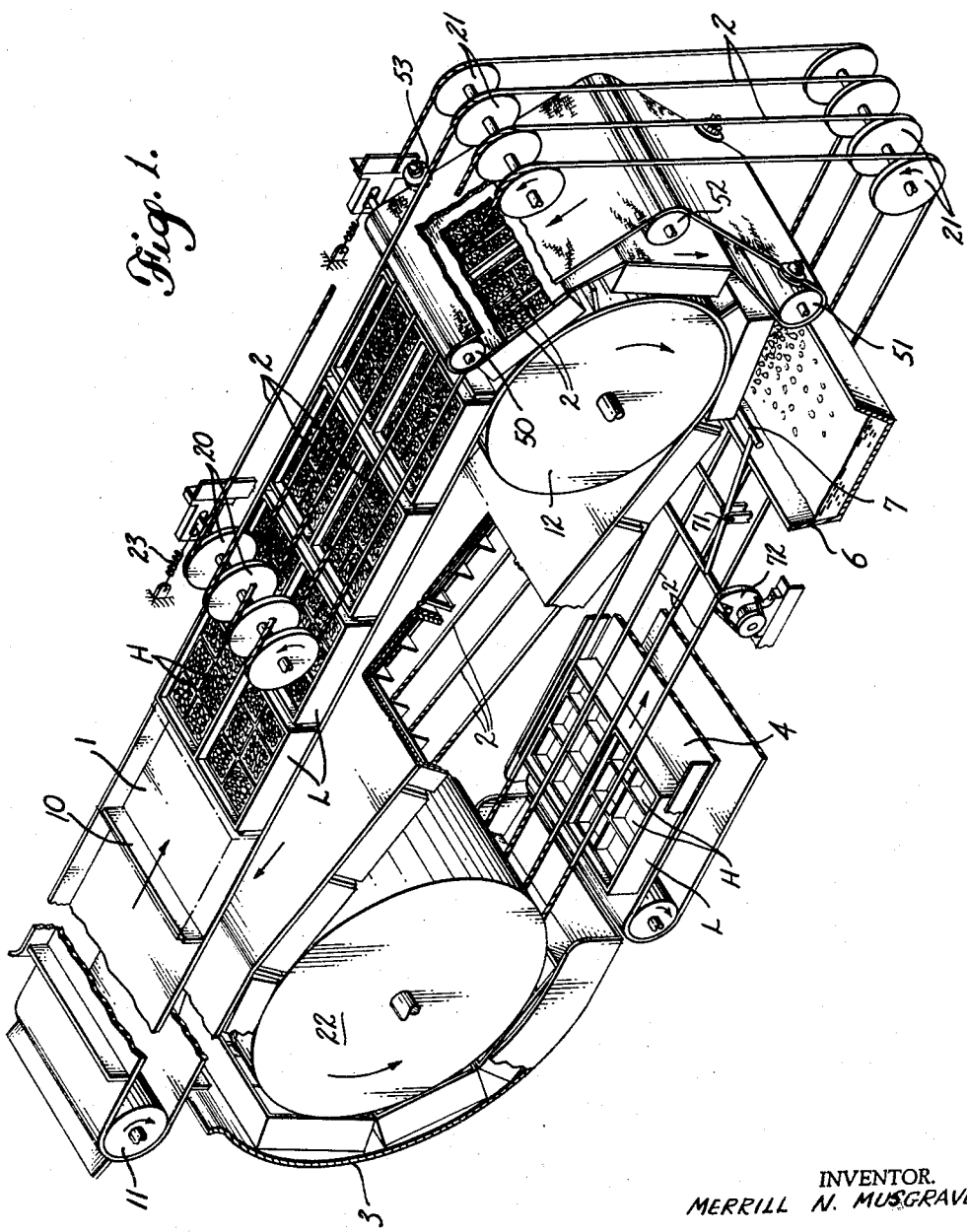
Figure 1 is an isometric view of the complete machine in one form of execution.

Individual lug boxes L, each supporting fruit-filled hallocks H, are advanced successively by suitable conveyor means illustrated at 1, which preferably takes the form of a belt having upstanding feed lugs 10 at lug-box intervals to engage and advance the lugs L. The conveyor belt 1 passes about a pulley 11 at or near the feed station and thence the conveyor extends generally horizontally, although it could be slanted somewhat, until it reaches a drum 12 at the inverting station. It is preferred that this drum be driven from the motor M, by a drive mechanism indicated at 13.

Beyond the inverting station which includes the drum 12 the conveyor belt 1 returns to the pulley 11, but passes over a drum 22 at the reinverting station, to be described later. Any suitable means (not shown) is provided for maintaining the conveyor belt 1 sufficiently taut and for supporting it and its load in the intermediate portions of its run.

At a point in advance of the inverting point, spaced cables or similar strands 2 which extend about a pulley 20 pass at a spacing above the conveyor belt 1 just sufficient to receive the lug boxes. These cables 2 are spaced at a transverse spacing such that at least one cable will overlie and engage each hallock in place within its lug box. These cables pass about the drum 12 but engage the initially upper and outer open face of the several lug boxes, thereby retaining the lug boxes in contact with the conveyor 1 as the latter passes about the drum 12, and retaining the hallocks in place within the lug boxes, for the hallocks would otherwise tend to fall from the lug boxes. These cables 2 continue on in parallelism with the conveyor belt 1 and pass about the drum 22, whence they return by way of guide pulleys 21 to the pulley 20. Their purpose is fulfilled when they have supported each lug box and its hallocks in their prearranged disposition from the point of inversion to the point of reinversion.

At the reinverting point the lug boxes and hallocks are conveyed around the pulley 22, or otherwise reinverted in the manner which will be described in conjunction with Figure 4. For instance, a shield 3 may be provided which overlies the lug boxes sufficiently closely about the drum 22, that while the lug boxes can slide around the shield through 180° the hallocks will still be retained within the lug boxes and will drop into their prearranged disposition when the lug boxes pass from the shield 3 onto the off-bearing conveyor 4.

It may be noted that the cables 2 are maintained reasonably taut by mechanism such as that indicated at 23. It will be noted that the height of the feed lugs 10 is approximately the height of the lug boxes, so that if a lug box should be omitted from a given space on the feed conveyor 1 the cables 2 will be pulled taut against the outer edges of the feed lugs 10 and the cables 2 will thereby be prevented from slackening to an extent that would destroy their usefulness.

It is necessary at the inverting station to catch and guide any fruit which may spill from the hallocks during the inversion, or, to prevent any spilling of the fruit until the hallocks and their lug boxes have reached the fruit-receiving means. One form of fruit-catching and guiding means is shown in Figure 1, and includes a blanket or endless belt 5 passing about pulleys 50, 51 and 52, and engaged by edge-guiding pulleys 53, this blanket being arranged to overlie the successive lug boxes from the point where inversion begins to the point where the fruit can be dumped directly into fruit-receiving means. The blanket 5 overlies the cables 2 but lies so closely to the open tops of the lug boxes and their hallocks that no fruit can spill so long as the blanket overlies the same. This blanket terminates at the fruit-receiving means, though the cables 2 continue on past the same. The purpose of the blanket is fulfilled when the lug boxes and hallocks have been inverted and the fruit is ready to be dumped into fruit-receiving means.

An alternative form of fruit-catching and guiding means is shown in Figure 3 and incudes a fixed shield 55 which lies closely enough to the lug boxes as they pass about the drum 12 that any fruits spilling from the hallocks will be caught by the shield 5 and guided by the latter to the fruit-receiving means. The movement of the fruit towards the fruit-receiving means may be assisted by water jets or like means directed downwardly of the interior wall of the shield 55.

Figure 5:
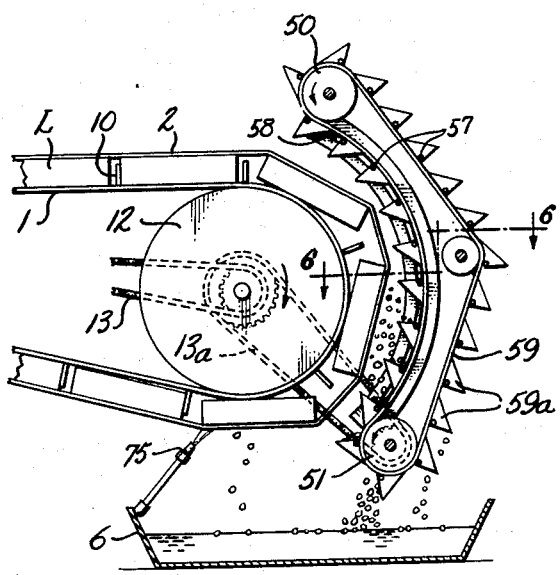
Figure 5 is a side elevational view of a modification in the fruit-receiving means at the inverting station.
Figure 6:
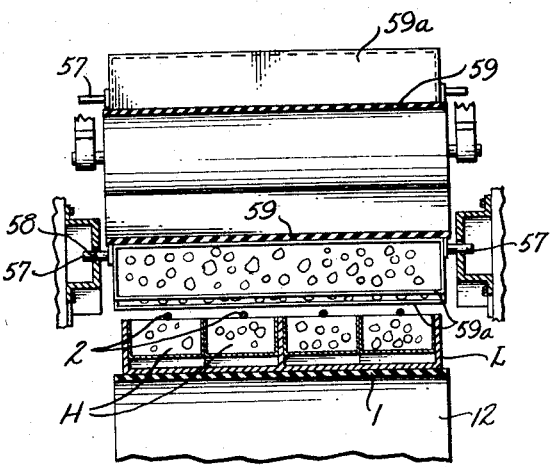
Figure 6 is a transverse sectional view at 6—6 of Figure 5.

Still another form of fruit-catching and guiding means is shown in Figures 5 and 6. Herein a conveyor belt 59 is arranged similarly to the blanket 5, except that it is spaced from the lug boxes and hallocks. Buckets 59a are carried by the conveyor belt 59, in position to receive fruit that spills from the hallocks, as the latter are inverted; rods or laterally projecting lugs 57, traveling in a guide slot 58, follow the curvature of the drum 12, but hold the buckets 59a from contact with the lug boxes L, on the downward run of conveyor belt 59. These buckets 59a all discharge as they become inverted in passing about the pulley 51. This pulley is driven in synchronism with the drum 12, so that the buckets 59a travel at the same rate of advance as the adjacent lug boxes, by a drive such as that indicated at 13a.

The fruit-receiving means may take various forms. Where the fruit must, of necessity, be washed, it is convenient to form the fruit-receiving means as a water-filled flume 6. A conveyor belt might be employed if the fruit must be kept dry.

It is desirable to incorporate mechanism to insure that no fruit will cling to the interior of individual hallocks but all will be discharged at the fruit-receiving station. A knocker is provided for this purpose in Figure 1, and consists of a mass 7 at the end of an arm 70 pivoted at 71 and actuated by a rotative cam 72, driven from the drum 12, so that each lug box or the cables 2 that support the same is struck repeatedly while it passes the fruit-receiving station. It has been found that this is adequate to insure complete dislodgement of the fruit. An alternative form is shown in Figures 3 and 5, and consists of a water jet 75 directed into the hallocks to dislodge fruit from the latter.

The alternative form of reinverting mechanism which is shown in Figure 4 consists primarily in guide rods 35 or the like defining a helical path and sufficiently closely embracing the individual lug boxes and their individual hallocks that none of the latter are permitted to escape from the lug boxes in the process of reinversion. These guide rods 35 define a path that may be described as corkscrew shaped.

The drum 12 is driven from the motor M, and preferably no other element is driven except from this drum. The cables 2 engage the lug boxes and so are driven at the correct speed relative to the drum 12 which supports and advances the conveyor 1. The blanket 5 likewise engages and advances with the lug boxes. The knocker 7, as already described, is actuated from the drum 12.

I claim as my invention:

1. Apparatus for dumping loose fruit from hallocks wherein the same is contained, when such hallocks, each of a given width, are disposed side by side within a lug box, and for reinverting such lug boxes and hallocks without displacement of the latter, such apparatus comprising conveyor means for supporting successive lug boxes originally in upright disposition and for advancing them along a path including an upright semicircular portion wherein they are inverted, a plurality of cables paralleling the conveyor, and extending at least through the inverting and inverted portions of the path, means supporting said cables, in conjunction with their engagement with the tops of the lug boxes, for advance along such path in consonance with the conveyor, said cables overlying the lug boxes at hallock width spacings, and at locations to engage each hallock between its edges, and restraining spilling of the hallocks from their lug boxes in the inverting portion of the path, said cables supporting the hallocks and the lug boxes in the inverted portion of the path, fruit-catching and guiding means overlying the lug boxes and said cables at the inverting portion of the path, fruit-receiving means beneath at least the initial part of the inverted portion of the path, positioned to receive fruit from the hallocks directly, and from said fruit-catching means, and means beyond the fruit-receiving means for reinverting the lug boxes and the hallocks in place therein.

2. Apparatus as in claim 1, including means at the fruit-receiving means for dislodging fruits which may tend to stick in the hallocks, to drop into the fruit-receiving means.

3. Apparatus as in claim 2, wherein a knocker is arranged at the fruit-receiving means, to rap the passing inverted lugs, and constituting the dislodging means.

4. Apparatus as in claim 1, including an endless conveyor belt, means guiding the belt so that one run thereof is spaced from, but parallels, the path of the lugs and hallocks throughout the inverting portion of such path, fruit-receiving buckets carried by said conveyor belt, in position to catch fruit that spills from the hallocks and lugs as they are inverted, means to advance said conveyor belt and its buckets in consonance with the advance of the lug box conveyor means, and means to invert the buckets for discharge of their contents into the fruit-receiving means.

5. Apparatus as in claim 1, including lug box guide means departing on a tangent from the inverted portion of the path of the lug boxes, continuing thence in the same general plane, and terminating after the lug boxes have been reinverted, said guide means including elements positioned to engage and retain individual hallocks within lug boxes while inverted, and said guide means constituting the reinverting means.

6. Apparatus for dumping loose fruit from and by inversion of hallocks arranged loosely within a lug box, and for reinverting such lug boxes and the hallocks without displacement of the latter, such apparatus comprising a belt-type conveyor for supporting the lug boxes originally in upright disposition as they advance, and rollers supporting and guiding said conveyor about an inverting point to but not about a reinverting point and finally about a point distant from the inverting point in an endless path, individual cables spaced laterally of such path by the spacing of the hallocks and paralleling that path, and disposed to engage the hallocks between their sides, rollers supporting and guiding said cables at a spacing outwardly of the lug box conveyor equivalent to the height of the lug boxes, and extending from an initial point at the latter portion of the upright part of their path, about the inverting point, along the inverted portion, about the reinverting point, and finally back to the initial point in an endless path, a blanket-like belt disposed exteriorly of and contacting the cables, and rollers guiding the blanket-like belt from a starting point, about the inverting point, and thence back to its starting point, fruit-receiving means disposed beneath the lug box conveyor and the cables at the point where the blanket-like belt begins its return to its starting point, and hallock-retaining means closely surrounding the path of the lug boxes about the reinverting point.

References Cited in the file of this patent

UNITED STATES PATENTS

| | | |
|---|---|---|
| 1,049,523 | Parker | Jan. 7, 1913 |
| 2,540,766 | Stilwell | Feb. 6, 1951 |
| 2,633,258 | Temple et al. | Mar. 31, 1953 |
| 2,662,653 | Bianchi et al. | Dec. 15, 1953 |
| 2,734,213 | Ashford | Feb. 14, 1956 |